(12) United States Patent
Kimura

(10) Patent No.: US 8,649,066 B2
(45) Date of Patent: Feb. 11, 2014

(54) IMAGE DISPLAY DEVICE AND IMAGE FORMING APPARATUS WITH SECURITY CONTROL FEATURES

(75) Inventor: Shinichi Kimura, Osaka (JP)

(73) Assignee: Kyocera Mita Corporation (JP)

( * ) Notice: Subject to any disclaimer, the term of this patent is extended or adjusted under 35 U.S.C. 154(b) by 912 days.

(21) Appl. No.: 12/764,172

(22) Filed: Apr. 21, 2010

(65) Prior Publication Data

US 2010/0271666 A1  Oct. 28, 2010

(30) Foreign Application Priority Data

Apr. 24, 2009  (JP) .................................. 2009-106367

(51) Int. Cl.
*H04N 1/40* (2006.01)

(52) U.S. Cl.
USPC ........................................................ 358/3.28

(58) Field of Classification Search
None
See application file for complete search history.

(56) References Cited

U.S. PATENT DOCUMENTS

| 2007/0058197 | A1* | 3/2007 | Miyamoto | .................... 358/1.15 |
| 2008/0013727 | A1 | 1/2008 | Uemura | |
| 2008/0313537 | A1* | 12/2008 | Tanaka | ........................... 715/274 |

FOREIGN PATENT DOCUMENTS

| JP | 11-55443 | 2/1999 |
| JP | 2003-32487 | 1/2003 |
| JP | 2003-32488 | 1/2003 |
| JP | 2005151149 | 6/2005 |
| JP | 2007081717 | 3/2007 |
| JP | 200865148 | 3/2008 |
| JP | 2008137233 | 6/2008 |
| JP | 2008154106 | 7/2008 |

* cited by examiner

*Primary Examiner* — Benny Q Tieu
*Assistant Examiner* — Sunil Chacko
(74) *Attorney, Agent, or Firm* — Gerald E. Hespos; Michael J. Porco; Matthew T. Hespos

(57) ABSTRACT

An image display device is provided with a storage for storing an image, a display for displaying a preview of the image, a security setting receiving unit for receiving setting as to whether or not the preview of the image is to be displayed with security, an image processing unit for applying an image quality degradation process to the image for which the security setting receiving unit received the setting for displaying the preview of the image with security, and a preview display controlling unit for causing the image having the image quality degradation process applied by the image processing unit to be displayed at the time of the preview display of the image for which the setting for the security display was received.

12 Claims, 13 Drawing Sheets

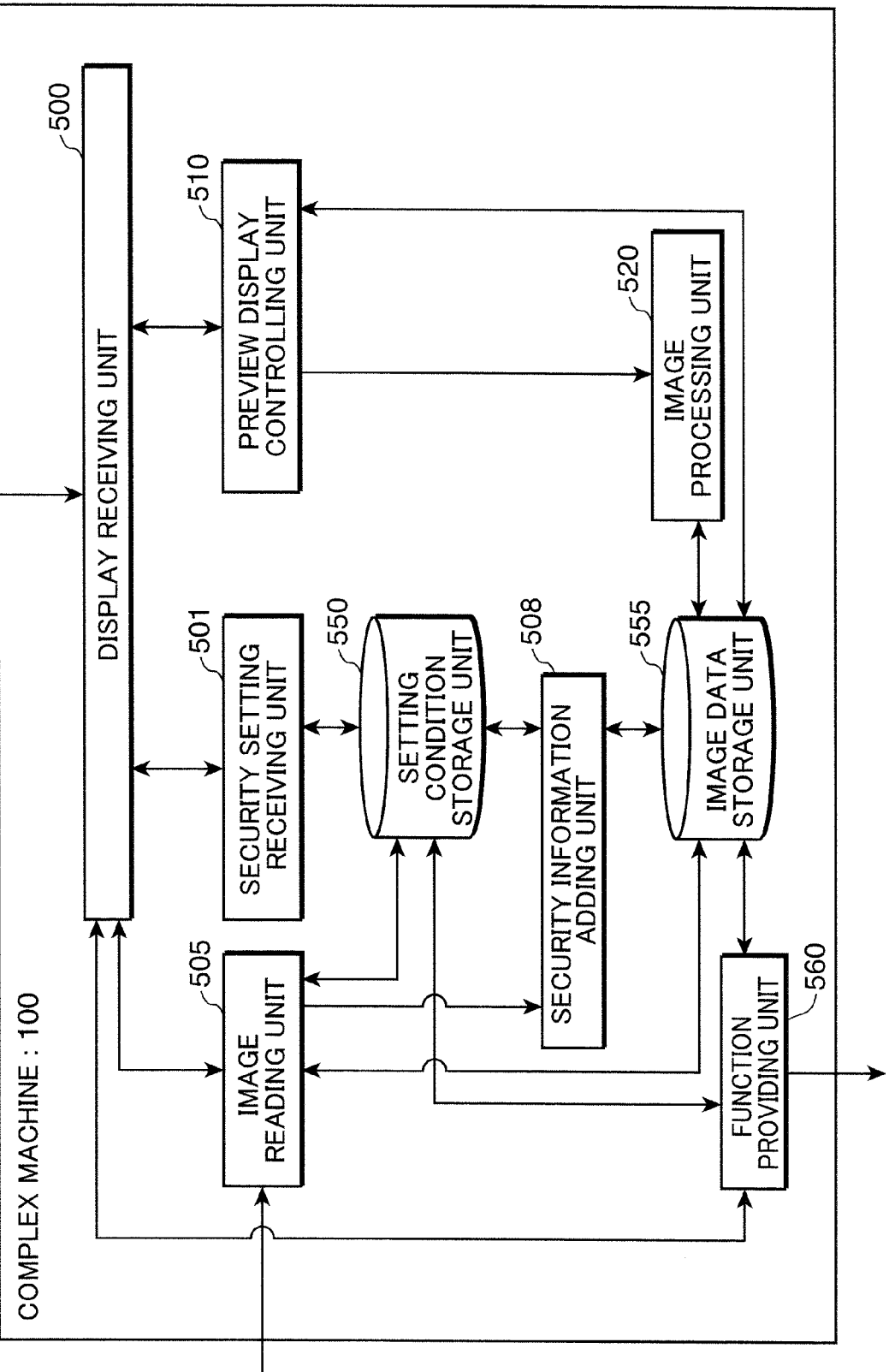

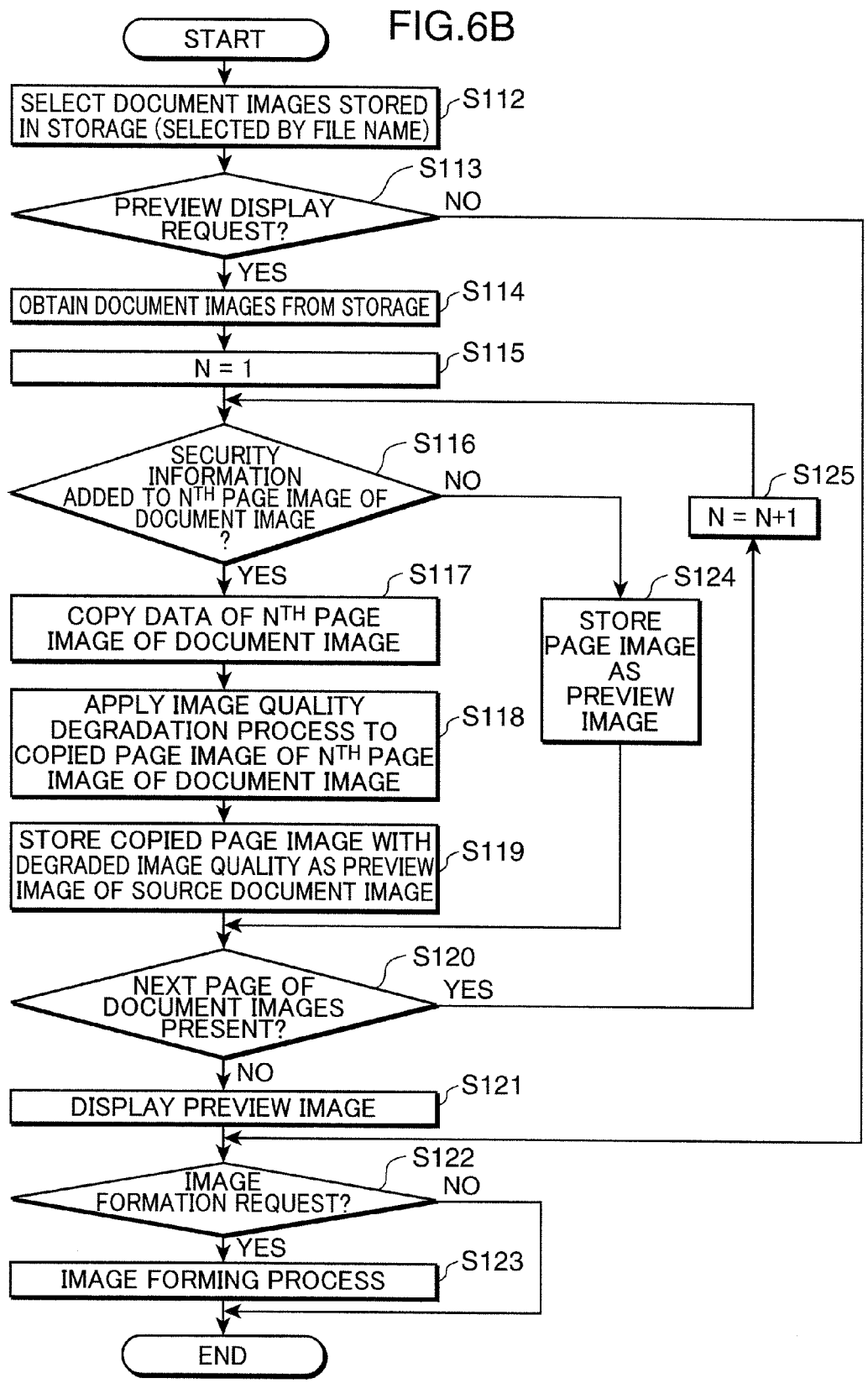

IMAGE DISPLAY DEVICE AND IMAGE FORMING APPARATUS WITH SECURITY CONTROL FEATURES

BACKGROUND OF THE INVENTION

1. Field of the Invention

The present invention relates to an image display device and an image forming apparatus provided with a function for displaying a preview of a read document image.

2. Description of the Related Art

Various functions are added to an image forming apparatus. A user can store a document image in the image forming apparatus beforehand and print the document image later on. At this time, since a document image, based on which an image is to be formed, needs to be specified, the user specifies the document, for example, on a preview screen of the image forming apparatus in some cases. This is because an erroneous document image may be formed if the document image is specified only by a file name.

As described above, a document image wished to have an image formed based thereon can be specified by confirming the preview screen. However, since the preview enables others to see this document image, many users avoid the preview. Particularly, if the document image is an image including a top secret, secret information is known to others through the preview display. A view on the display of the image forming apparatus can be enlarged, and a document image can be more clearly displayed than at present as the display technology progresses. Thus, there exist several patent documents disclosing a conventional technology for preview display in consideration of security.

The conventional technology is the one for preventing a document image to be seen by others by replacing the entire page specified by a user with another image at the time of preview display. However, the entire page is replaced by the other image if a preview is made using the above conventional technology. Thus, not only the others cannot see the document image, but also the user himself cannot specify the previewed document image. If the user himself cannot specify a document image as with the conventional technology, the meaning of the preview display is lost.

SUMMARY OF THE INVENTION

An object of the present invention is to provide a technology which considers security and enables only a user to specify a previewed document image.

In order to accomplish this object, one aspect of the present invention is directed to an image display device, including a storage for storing an image; a display for displaying a preview of the image; a security setting receiving unit for receiving setting as to whether or not the preview of the image is to be displayed with security; an image processing unit for applying an image quality degradation process to the image for which the security setting receiving unit received the setting for displaying the preview of the image with security; and a preview display controlling unit for causing the image having the image quality degradation process applied by the image processing unit to be displayed at the time of the preview display of the image for which the setting for the security display was received.

Further, another aspect of the present invention is directed to an image forming apparatus, including a printing unit for forming an image on a sheet; and an image display device for displaying an image, wherein the image display device has the above construction.

These and other objects, features and advantages of the present invention will become more apparent upon reading the following detailed description. Further, advantages of the present invention will become more apparent in the following description with reference to accompanying drawings.

BRIEF DESCRIPTION OF THE DRAWINGS

FIG. 5 is a functional block diagram of the complex machine according to the first embodiment.

FIGS. 6A and 6B are flow charts showing a preview display process according to the first embodiment.

DETAILED DESCRIPTION OF THE PREFERRED EMBODIMENTS (Image Forming Apparatus)

First of all, an image forming apparatus used in this embodiment is described. The image forming apparatus is equivalent to a complex machine provided with a printer, a copier, a scanner and a facsimile machine, etc., a digital copier, a printer or the like and functions as an image forming apparatus with a copy service, a scanner service, a facsimile service, a printer service and other services. In this embodiment, a complex machine 100 is illustrated as the image forming apparatus. An image display device according to the present invention is incorporated into this complex machine 100.

Figure 1:
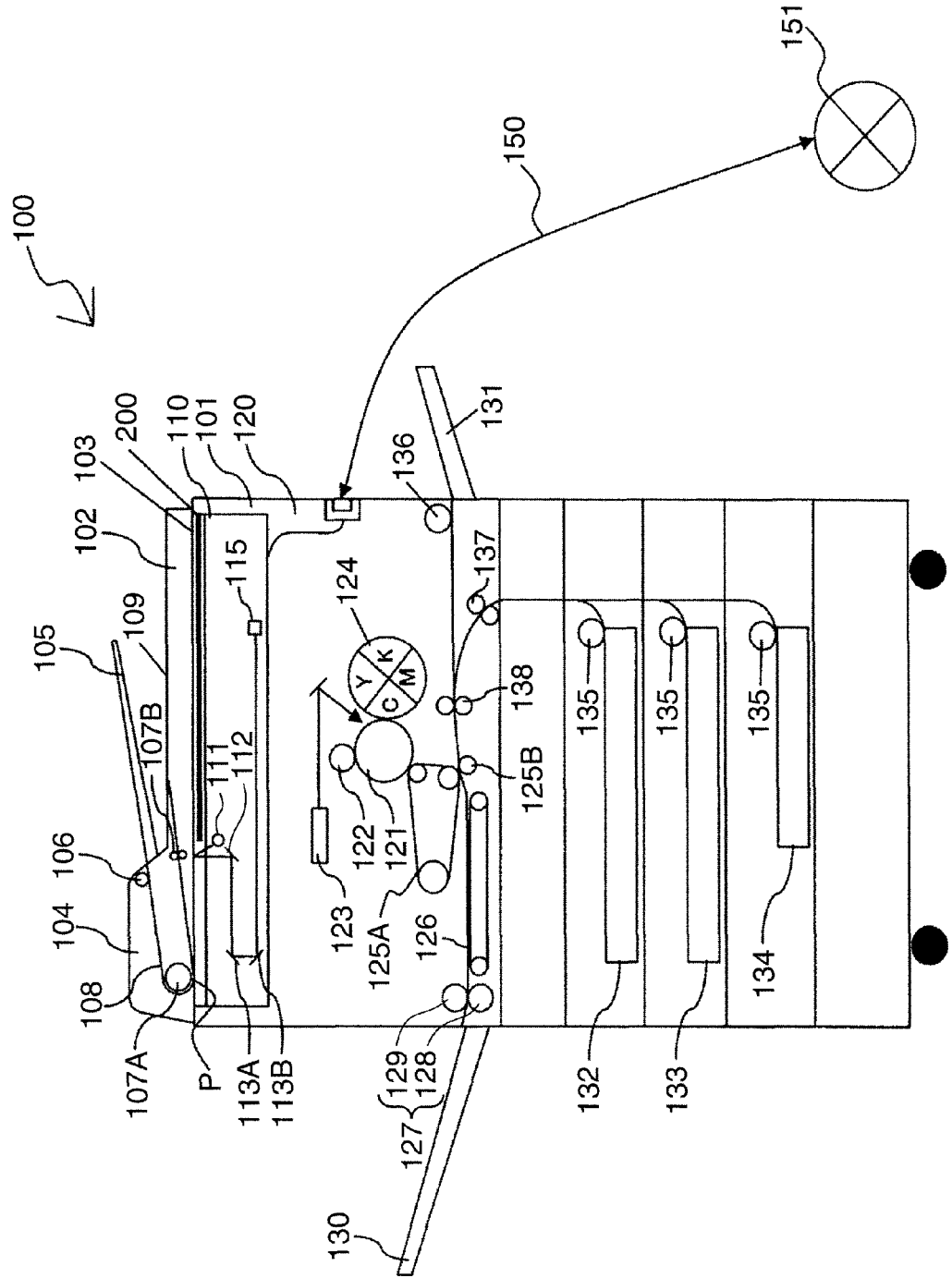
FIG. 1 is a diagram showing the entire construction of a complex machine (image forming apparatus) according to a first embodiment of the invention.

FIG. 1 is a schematic diagram of the complex machine 100, wherein details of the respective parts not directly related to the present invention are not shown. As an example, an operation upon copying a document using the complex machine 100 is briefly described.

When, for example, printing a document using the complex machine 100, a user places the document on a document platen 103 or a placing platen 105 shown in FIG. 1 and gives a print instruction to an operation unit 200 provided near the document platen 103. Upon this instruction, the respective parts (driving parts) described below operate for printing.

The complex machine 100 includes a main body 101 and a platen cover 102 mounted above the main body 101. Although not shown in FIG. 1, the operation unit 200 (see FIG. 3) used to give various operation instructions to the complex machine 100 is provided on the front side. The document platen 103 made of a contact glass is provided on the upper surface of the main body 101 and opened and closed by the platen cover 102. The platen cover 102 is provided with an automatic document feeder 104, the placing platen 105 where documents are to be placed, and a discharge platen 109 to which documents are to be discharged.

In the case of automatically reading a document, the document placed on the placing platen 105 is taken into a document conveyance path 108 by a take-in roller 106 and introduced to a document reading position P set right below a platen roller 107A. Thereafter, the document is discharged to the discharge platen 109 by discharge rollers 107B. In the case of manually reading a document, the user opens the platen cover 102 upward and places the document on the document platen 103.

Figure 2:
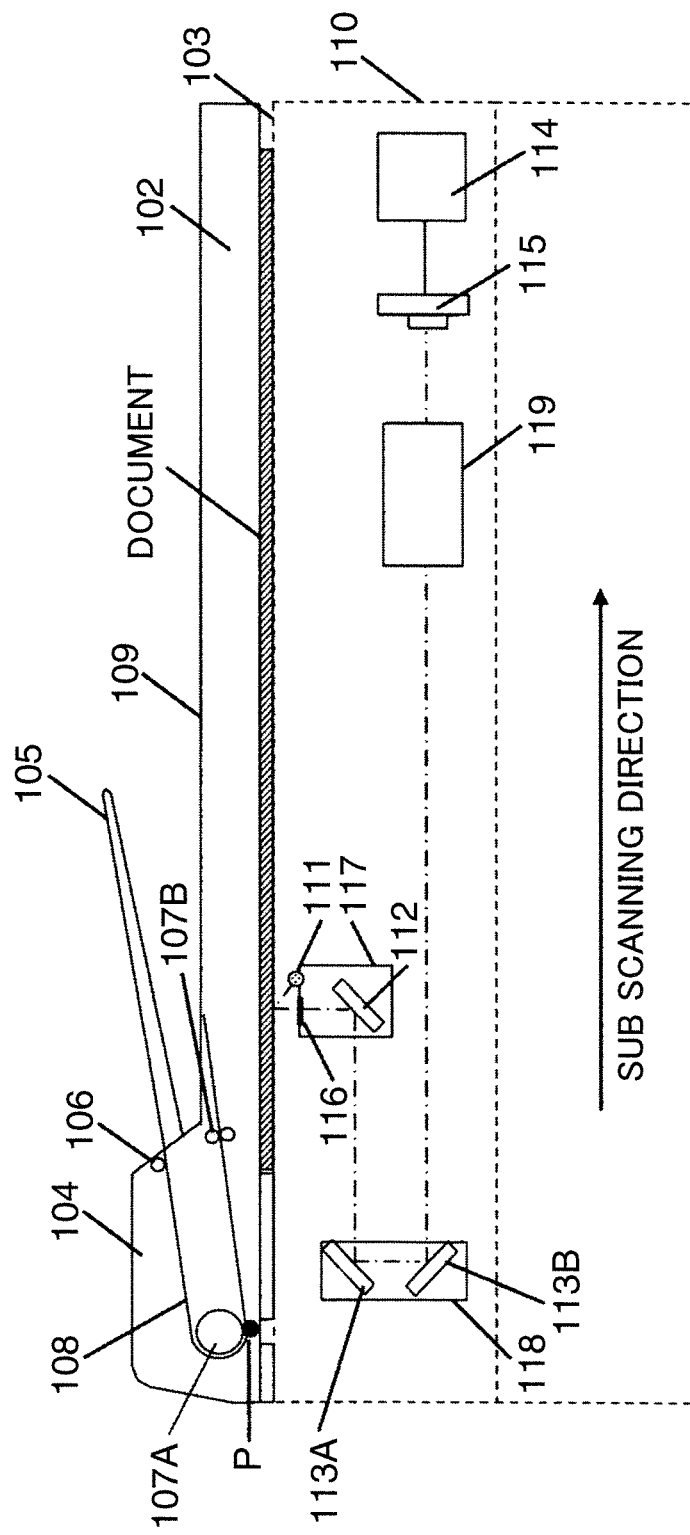
FIG. 2 is a diagram showing a schematic construction of a reading unit.

A reading unit 110 for optically reading the document is arranged below the document platen 103 and is shown in detail in FIG. 2. The reading unit 110 is provided with a light source 111 long in a main scanning direction and adapted to irradiate the document platen 103, a first moving carriage 117 including a slit 116 for selectively permitting the passage of light from the document platen 113 and a mirror 112 for guiding the light from the document platen 113, a second moving carriage 118 including mirrors 113A, 113B for reflecting the reflected light from the first moving carriage 117 again, a lens group 119 for optically correcting the light guided by these mirrors 113A, 113B, an image pickup device 115 for receiving the light corrected by the lens group 119 and an image data generator 114 for converting the light received by the image pickup device 115 into an electrical signal and applying correction, modification or the like if necessary.

In the case of reading a document fed by the automatic document feeder 104, the light source 111 moves to a position where it can irradiate the reading position P and emits light there. The light from the light source 111, which passes through the document platen 103, is reflected by the document passing the reading position P and is introduced to the image pickup device 115 by the slit 116, the mirrors 112, 113A, 113B and the lens group 119. The image pickup device 115 converts the received light into an electrical signal and sends this signal to the image data generator 114. R (red), G (green) and B (blue) analog electrical signals corresponding to the light received by the image pickup device 115 are input to the image data generator 114, where the signals are analog-to-digital converted, i.e. digitized. Further, in the image data generator 114, the successively converted digital signals form unit data and an image data composed of a plurality of unit data is generated by applying correction, modification and the like to these unit data.

In the case of reading a document placed on the document platen 103 using the reading unit 110, the first moving carriage 117 moves in a sub scanning direction while light is emitted from the light source 111. The second moving carriage 118 moves in a direction toward the image pickup device 115 at half the speed of the first moving carriage 117 in order to make the length of an optical axis from the light source 111 to the image pickup device 115 constant.

A printing unit 120 for forming (printing) an image on a sheet is arranged below the reading unit 110 of the main body 101. Images which the printing unit 120 can print are based on image data generated by the image data generator 114 as described above and image data transmitted together with an instruction for image formation from a network 151 via a communication cable 150 connected to the complex machine 100.

The printing unit 120 includes a photoconductive drum 121 on which an electrostatic latent image and a toner image are to be formed, a charger 122 for uniformly charging the circumferential surface of the photoconductive drum 121, an exposing device 123 for forming an electrostatic latent image by irradiating the circumferential surface of the photoconductive drum 121 with a laser beam, a rotary developing device 124 for developing the electrostatic latent image into a toner image by supplying toner to the photoconductive drum 121, an intermediate transfer belt 125A to which the toner image is primarily transferred, and a transfer roller 125B for secondarily transferring the toner image on the intermediate transfer belt 125A to a sheet.

An electrophotographic printing method is employed by the printing unit 120. Specifically, the circumferential surface of the photoconductive drum 121 is uniformly charged by the charger 122 and a laser beam corresponding to an image data is irradiated from the exposing device 123 to the photoconductive drum 121, whereby an electrostatic latent image is formed on the circumferential surface of the photoconductive drum 121. This electrostatic latent image is developed into a visible image (toner image) by the supply of toner from the developing device 124, and this visible image is transferred to a sheet by the transfer roller 125B.

Sheets to have visible images transferred thereto are those placed on sheet feed trays such as a manual feed tray 131 and sheet cassettes 132, 133 and 134. When a printing process is performed by the printing unit 120, a sheet is picked up from any one of the sheet cassettes 132, 133 and 134 by a pickup roller 135. The picked-up sheet is fed to between the intermediate transfer belt 125A and the transfer roller 125B by conveyor rollers 137 and registration rollers 138. A sheet placed on the manual feed tray 131 is fed to the printing unit 120 by a pickup roller 136 for the manual feed tray 131.

The sheet having the visible image on the intermediate transfer belt 125 transferred thereto in the printing unit 120 is conveyed to a fixing device 127 by a conveyor belt 126 to have the visible image fixed thereto. The fixing device 127 includes a heating roller 129 with a built-in heater and a pressure roller 128 pressed against the heating roller 129 with a specified pressure. When the sheet passes between the heating roller 128 and the pressure roller 129, the visible image is fixed to the sheet by heat and a pressing force to the sheet. The sheet having passed through the fixing device 127 is discharged to a discharge tray 130.

The above process is a process of a basic copy service in the complex machine 100. The complex machine 100 provides the user with other functions, for example, such as a facsimile transmitting and receiving function, a printing function, a scanning function, a post-processing function and a memory function by appropriately and cooperatively operating the above respective parts (reading unit 110, printing unit 120).

Figure 3:
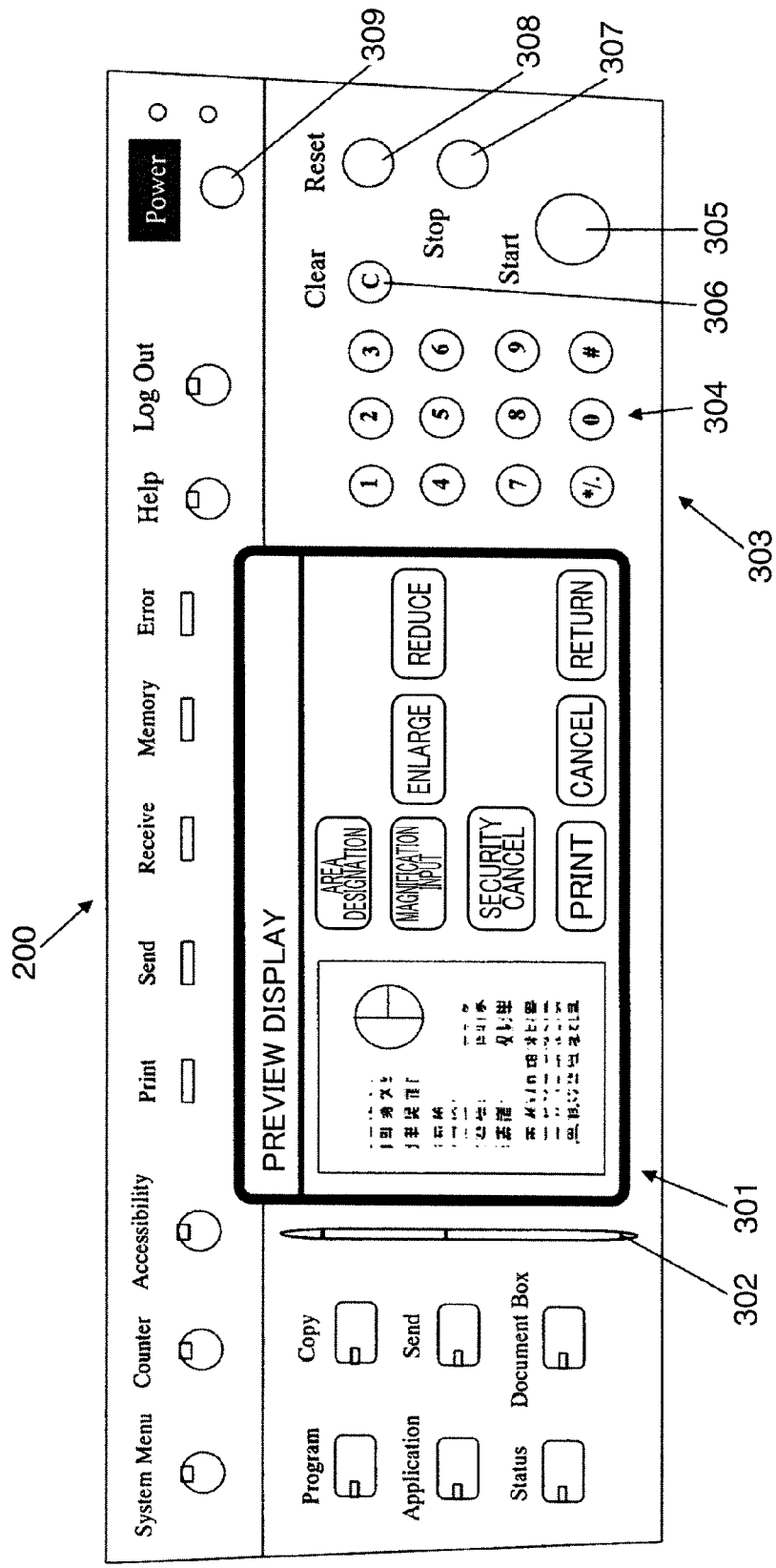
FIG. 3 is a top view of an operation unit.

FIG. 3 is a diagram showing an exemplary appearance of the operation unit 200 (part of the image forming apparatus) of the complex machine 100. The user inputs setting conditions and the like for the above functions using the operation unit 200. When setting conditions are set, the execution of the respective services is started, or parameters are set on a maintenance mode screen, a touch panel 300, a touch pen 302 and operation keys 303 provided on the operation unit 200 are used. By pressing a selection item or the like on a screen (e.g. image formation screen) displayed on the touch panel 301, the setting conditions related to the selection item are input.

A preview image of an image planned to be printed by the printing unit 120 is displayed on the touch panel 301. A display (not shown) such as a monitor for displaying a preview image may be provided in addition to the touch panel 301.

The touch pen 302 is provided near the touch panel 301. If the user touches the touch panel 301 with the tip of this touch pen 302, a sensor disposed below the touch panel 301 detects a touched part. Thus, by the contact of the touch pen 302, it is possible to press the keys on a keyboard screen and input specified hand-written information. The specified hand-written information is converted into specified characters or the like as needed.

A specified number of operation keys 303 are provided near the touch panel 301. For example, the keys include a numerical pad 304, a start key 305, a clear key 306, a stop key 307, a reset key 308 and a power key 309. The numerical pad 304 is used to input a specific number upon setting the number of copies to be made and magnification.

Figure 4:
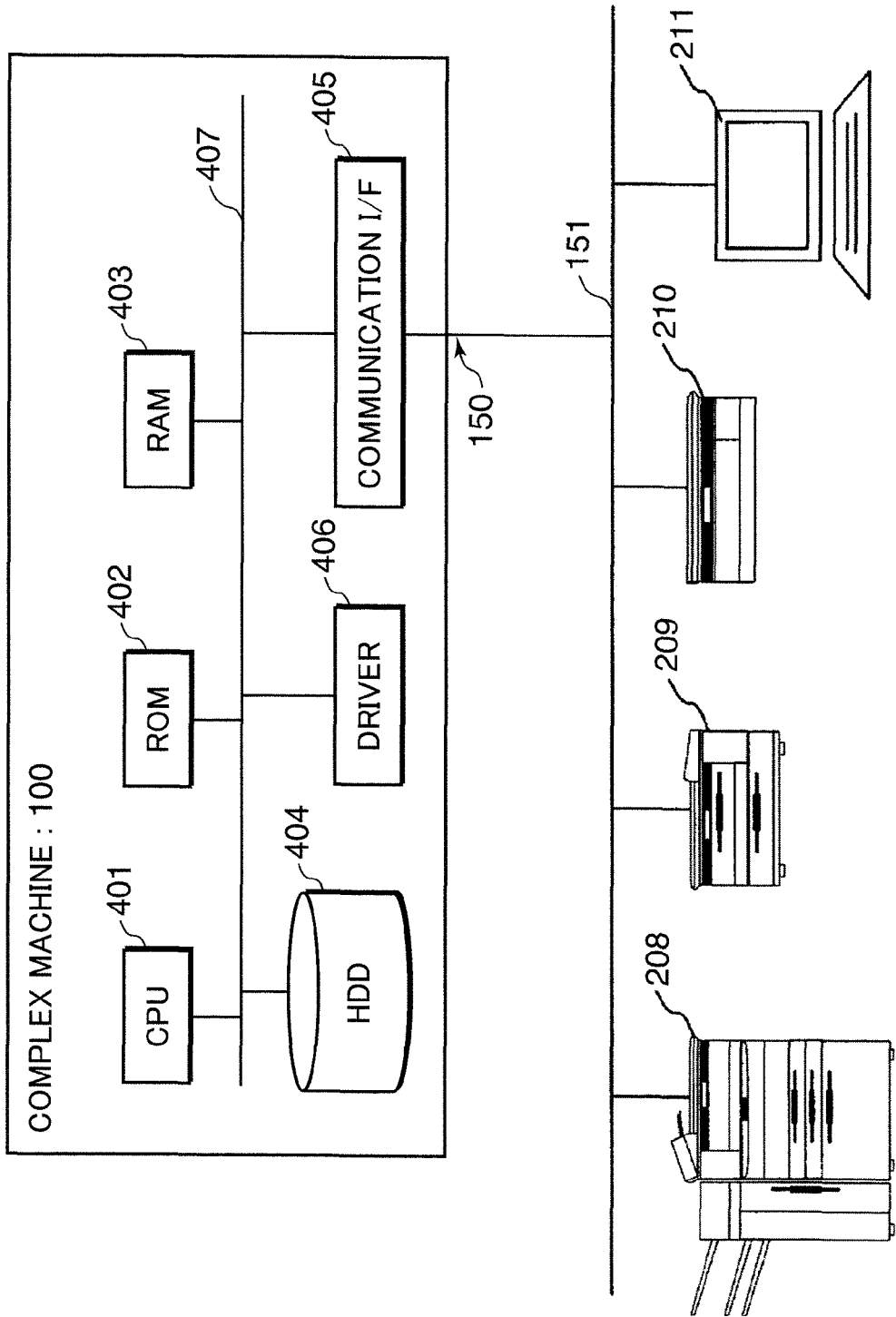
FIG. 4 is a block diagram showing the construction of a control system hardware of the complex machine according to the first embodiment.

Next, the construction of a control system hardware of the complex machine 100 is described with reference to FIG. 4. FIG. 4 is a schematic construction diagram of the control system hardware in the complex machine 100, wherein details of the respective parts not directly related to the present invention are not shown.

A control circuit of the complex machine 100 includes a CPU (Central Processing Unit) 401, a ROM (Read Only Memory) 402, a RAM (Random Access Memory) 403, a HDD (Hard Disk Drive) 404 and a driver 406 corresponding to the respective driving parts, and these are connected by an internal bus 407. The CPU 401 uses the RAM 403 as a work area, executes programs stored in the ROM 402, the HDD 404 and the like, receives data, instructions and the like from the driver 406 and the operation unit 200 based on the execution result and controls the operations of the respective driving parts shown in FIGS. 1 to 3. Further, the CPU 401 executes the programs for the parts other than the driving parts to realize the respective functions (shown in FIG. 5) to be described. Programs and data for realizing the above respective functions are stored in the ROM 402, the HDD 404 and the like.

Further, a communication interface 405 is connected to the network 151 formed by the communication cable 150. A personal computer (PC) 211, another complex machine 208, a facsimile machine 209, a scanner 210 and the like are connected to this network 151. The CPU 401, for example, transfers and receives data to and from the PC 211 connected to the network 151 via the communication interface 405. This also holds true for other devices.

(First Embodiment)

FIG. 5 is a functional block diagram of a complex machine 100 according to a first embodiment. The complex machine 100 is provided with a display receiving unit 500, an image reading unit 505, an image data storage 555 (storage), a security setting receiving unit 501, a setting condition storage 550, a security information adding unit 508, an image processing unit 520, a preview display controlling unit 510 and a function providing unit 560 for displaying a preview of a document image with security. Here, security display is a display mode for making it difficult to easily read the content of an image by degrading the quality of an image to be previewed.

The display receiving unit 500 causes the touch panel 301 (display) of the operation unit 200 to display various pieces of information and a touch panel screen and receives the input of operation information which the user gives to the touch panel screen.

The image reading unit 505 controls the above reading unit 110 and automatic document feeder 104 to obtain an image data of a document. The display reading unit 505 also stores this image data in the image data storage 555 and notifies the security information adding unit 508 of the storage of the image data.

The image data storage 555 stores the image data of the document image obtained by the image reading unit 505 in relation to an identifier such as its file name. The image data storage 555 additionally stores an added identifier indicating the addition of security setting for an image data of a document image with security setting.

The security setting receiving unit 501 receives a document reading condition and a security preview setting condition through the touch panel 301 and stores these conditions in the setting condition storage 550. The setting condition storage 550 stores these document reading condition and security preview setting condition in relation to the identifier such as the fine name.

The security information adding unit 508 adds an added identifier indicating that security setting is given to an image data with security setting out of the image data of the document images stored in the image data storage 555 and stores it in the image data storage 555. This added identifier is security information to the effect of security display and including an image quality degradation processing method at the time of security display.

The image processing unit 520 applies an image quality degradation process to a document image, for which the security setting receiving unit 501 received such setting for displaying a preview of the document image with security. As an example of the image quality degradation process, a process for reducing the resolution of an image can be illustrated. The process of the image processing unit 520 is described in detail later.

The preview display controlling unit 510 causes the touch panel 301 to display a preview of the document image stored in the image data storage 555 when a preview display instruction is given to the display receiving unit 500 (touch panel 301). Particularly, at the time of displaying a preview of a document image with security display setting, the document image having the image quality degradation process applied by the image processing unit 520 is displayed.

The function providing unit 560 provides various functions of the complex machine 100 in accordance with an instruction given from the display receiving unit 500. For example, the function providing unit 560 obtains a document image from the image data storage 555 and forms an image of the document image on a sheet.

Figure 6A:
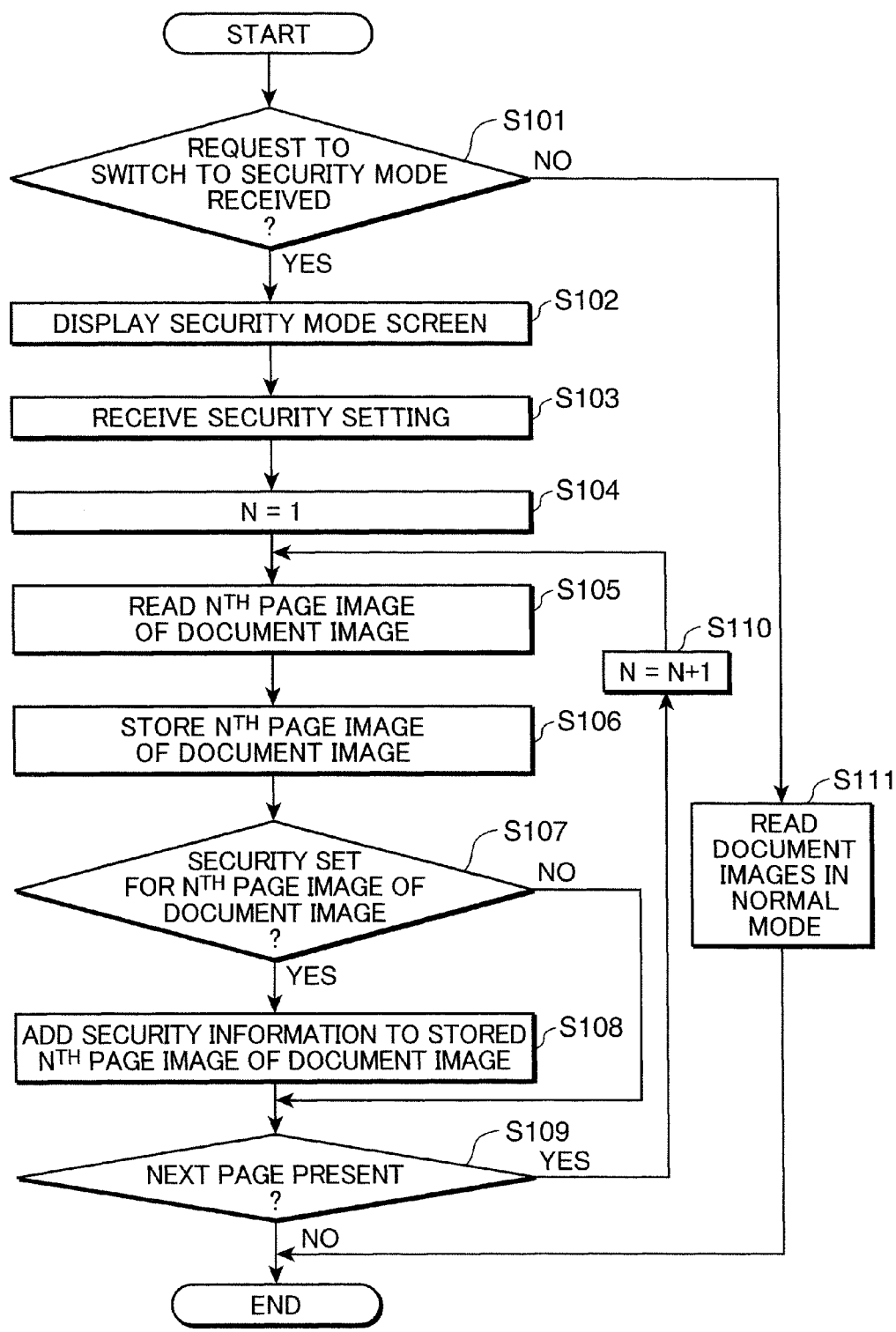
Figure 7A:
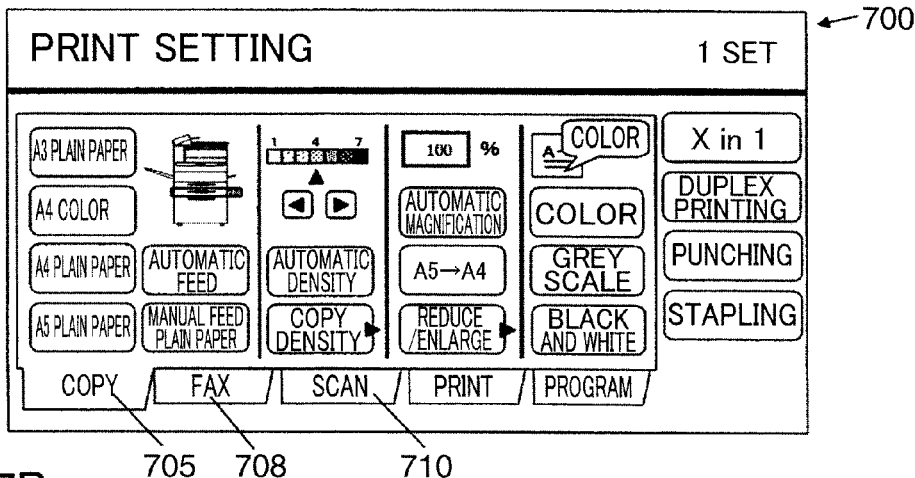
FIGS. 7A, 7B and 7C are diagrams showing exemplary screens to be displayed on a touch panel.
Figure 7B:
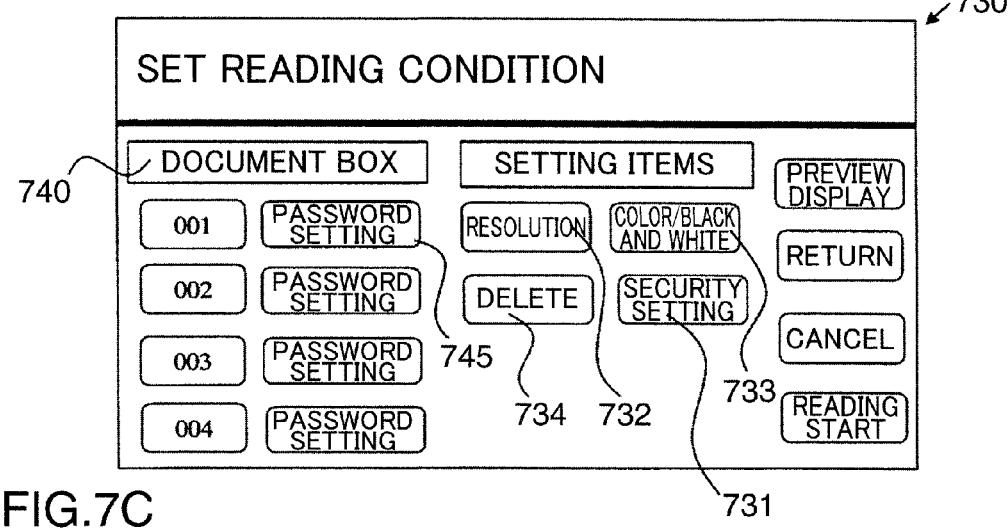
Figure 7C:
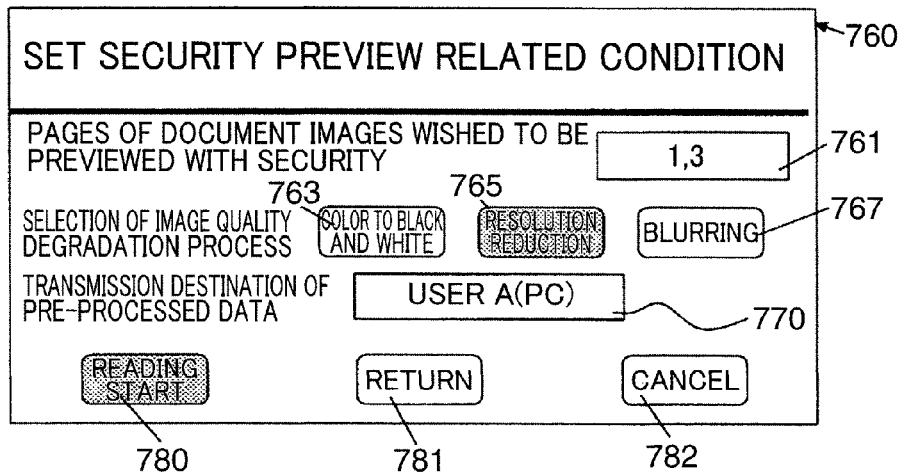

Next, the procedure of the security display process of the complex machine 100 according to the first embodiment is described with reference to FIGS. 6A, 6B, 7A, 7B and 7C in addition to FIG. 5. FIGS. 6A and 6B are flow charts showing the security display process of the complex machine 100 according to the first embodiment. FIGS. 7A, 7B and 7C are diagrams showing exemplary screens to be displayed on the touch panel 301.

The display receiving unit 500 displays a processing condition setting screen 700 shown in FIG. 7A as an initial screen on the touch panel 301. Various processing functions are displayed on the processing condition setting screen 700. For example, a processing item 705 relating to the copy function is displayed on the processing condition setting screen 700. Further, a processing item tab 708 relating to facsimile, a processing item tab 710 relating to document reading, etc. are displayed on the above processing condition setting screen 700.

By pressing down any of the above processing item tabs, the user can display a second layer screen for the input of setting conditions relating to the various processing functions. For example, if the user selects the processing item tab 710 relating to document reading, the display receiving unit 500 displays a reading condition input screen 730 relating to document reading as shown in FIG. 7B.

A "SECURITY DISPLAY" item 731 selected to display a setting condition input screen relating to security preview to be described later is displayed on the reading condition input screen 730. Further, a "DOCUMENT BOX" item 740 selected to store the read document image is displayed together with a "PASSWORD SETTING" item 745, with which a password used to open this "Document BOX" can be set. In addition to the above items, a "RESOLUTION" item 732, a "COLOR/BLACK AND WHITE" item 733, a "DELETE" item 734, etc. are displayed on the reading condition input screen 730.

If the user then presses down the "SECURITY DISPLAY" item 731 on the reading condition input screen 730, this means a request from the user to switch to a security mode and, hence, the security display process is started. As the item 731 is pressed down, the display receiving unit 500 displays a security preview setting condition input screen 760 relating to security preview as shown in FIG. 7C (FIG. 6A: Step S101→S102).

Security preview setting can be made for each document (for each page). For example, it is possible to set the security preview display (hereinafter, security display) for which page of image out of a group of document images of one job. A page number input item 761 used to input the page number of the document image wished to be displayed with security is displayed on the security preview setting condition input screen 760. In addition, a "COLOR TO BLACK AND WHITE" item 763, a "RESOLUTION REDUCTION" item 765 and a "BLURRING PROCESS" item 767, which are items used to select the image quality degradation process, are displayed at the time of security display.

The user gives selection and instruction on the reading condition input screen 730 to select the document reading conditions and the number of a document BOX in which the read document image is to be stored. Upon selecting the document BOX number, it is preferable to press down the above "PASSWORD SETTING" item 745 and set a specified password.

For example, if the "PASSWORD SETTING" item 745 for the document BOX of number "001" under the "DOCUMENT BOX" item 740 is pressed down, a screen (not shown) enabling the registration of a password necessary to open the document BOX of number "001" is displayed. A construction enabling the registration of a specified password on this screen by user can be employed. The input of a password is requested upon opening the above document BOX of number "001", it is judged whether or not the input password coincides with the pre-registered password, and the document BOX is opened if these two passwords coincide.

If the "SECURITY DISPLAY" item 731 is pressed down and the security preview setting condition input screen 760 is displayed by the display receiving unit 500 as described above, the security preview setting condition is input by the user on this input screen 760 (FIG. 6A: S103). The page of the document image wished to be displayed with security is input as the above setting condition on the page number input item 761. In this embodiment, it is assumed that the first and third pages are to be displayed with security and the "RESOLUTION REDUCTION" item 765 is selected out of the items of the image quality degradation process.

Subsequently, the user sets a stack of documents including security designated documents (documents wished not to be seen by others) on the automatic document feeder 104 of the complex machine 100 and presses down a "READING START" item 780. At this time, the stack of documents is so set that the security designated documents are located on pages (first and third pages in this embodiment) input in the above page number input item 761.

If the stack of documents is set in this way and the "READING START" item 780 is pressed down, the security setting receiving unit 501 receives the above document reading condition and the security preview setting condition and stores them in the setting condition storage 550.

Further, if the "READING START" item 780 is pressed down, the image reading unit 505 starts reading the documents and image data of the read document images are successively stored in the image data storage 555 (FIG. 6A: S104→S105→S106). For example, the read document images are stored in the image data storage 555 with a file name added thereto. Here, the images of the respective pages of the document images read by the image reading unit 505 are called page images.

After storing the image data of the document images in the image data storage 555, the image reading unit 505 notifies the security information adding unit 508 that the read page images were stored in the image data storage 555. In response to this, the security information adding unit 508 refers to the security preview setting condition stored in the setting condition storage 550 and judges whether or not security setting was given by the user for each of the page images of the document images stored in the image data storage 555 (FIG. 6A: S107).

Here, if it is judged that security setting is given, the security information adding unit 508 adds security information to the effect of security display and including the image quality degradation processing method ("resolution reduction") at the time of security display to the page images of the document images stored in the image data storage 555.

Since security setting is made for the first and third pages in this embodiment, the above security information is added to the page images of the first and third pages of the document images stored in the image data storage 555 (FIG. 6A: YES in 5107→S108).

The image reading unit 505 performs the same process as above to all the documents (FIG. 6A: S109→S110) while judging whether or not the next page of the document is present (FIG. 6A: S109). On the other hand, if there is no request from the user to switch to the security mode, the documents are read in a normal mode (FIG. 6A: NO in S101→S111→END).

As described above, there are cases where the user wishes to display previews of the contents of the document images stored in the image data storage 555 after the image reading unit 505 reads all the documents set by the user and stores the read images in the image data storage 555. The preview display in this case is made in the following procedure.

First of all, the display receiving unit 500 displays the processing condition setting screen 700 shown in FIG. 7A. The user wishing to display the previews of the contents of the document images selects the processing item tab 710 relating to document reading on the above processing condition setting screen 700. In response to this, the display receiving unit 500 display the reading condition input screen 730 of FIG. 7B.

Figure 8A:
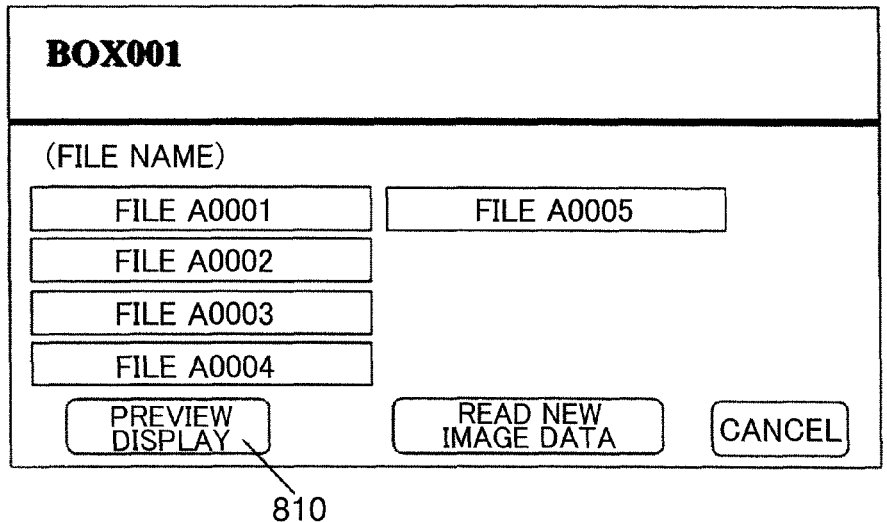
FIGS. 8A, 8B and 8C are diagrams showing other exemplary screens to be displayed on the touch panel.

When the user presses down the number (e.g. "001") of the "DOCUMENT BOX" item 740 in which the document images are stored, the display receiving unit 500 displays a list of file names stored in this document BOX as shown in FIG. 8A and receives the selection of the file name of the desired document images from the file names displayed in the list (FIG. 6B: S112). If password authentication is necessary upon opening the "DOCUMENT BOX", the "DOCUMENT BOX" is opened after the password authentication and the above list is displayed.

If the specified file name of the document images is selected, the preview display controlling unit 510 waits for a preview display request from the user. If the user presses down a "PREVIEW DISPLAY" item 810 (FIG. 6B: YES in S113), the preview display controlling unit 510 obtains the document images selected by the user from the image data storage 555 in response to this (FIG. 6B: S114). Subsequently, the preview display controlling unit 510 displays the previews of all the pages of the document images obtained from the image data storage 555. For the pages with security preview setting are displayed with security in a manner as described below.

Upon obtaining the document images from the image data storage 555, the preview display controlling unit 510 sets a page number counter to 1 and judges whether or not the obtained document images include any page image added with the security information (FIG. 6B: S115→S116).

Here, if a specific page is added with the security information, the preview of this page image is displayed as follows.

Specifically, the preview display controlling unit 510 instructs the image processing unit 520 to perform an image processing in accordance with the security information for the page image added with the security information out of the above document images. In response to this, the image processing unit 520 copies the data of the above page image from the image data storage 555 (FIG. 6B: S117). Hereinafter, the page image as a copy source is called a source copy image and the copied image of the source page image is called a copied page image.

The image processing unit 520 applies the image quality degradation process to the above copied page image as follows upon obtaining the copied page image (FIG. 6B: S118).

First of all, the image processing unit 520 obtains the image quality degradation processing method at the time of security display by referring to the security information added to the copied page image. In this embodiment, the "resolution reduction" is obtained as the image quality degradation processing method. Further, the image processing unit 520 divides an area of the above copied page image into a character area (specific area) as an area representing character and a non-character area as an area other than the character area.

A known method can be employed as the method by which the image processing unit 520 divides an area of a copied page image into a character area and a non-character area. For example, the image processing unit 520 calculates contrasts to adjacent pixels for each pixel constituting the copied page image upon obtaining the above copied page image. If the calculated contrasts are higher than a value predetermined to extract a character image, the image processing unit 520 judges that this pixel constitutes the character image and extracts the character area from the above copied page image.

After the area of the copied page image is divided into the character area and the non-character area as described above, the image processing unit 520 applies the image quality degradation process to the copied page image by the image quality degradation processing method at the time of security preview, which method is obtained from the security information added to the document image data.

In this embodiment, the "resolution reduction" is obtained as the above image quality degradation processing method. Thus, the image processing unit 520 selects a process of reducing the resolution of the copied page image as the image quality degradation processing method. In this case, the image processing unit 520 reduces the resolution of the character area of the copied page image to a specified value. The specified value used to reduce the resolution can be arbitrarily set. The image quality degradation process may also reduce the resolution of the non-character area.

Next, the image processing unit 520 stores the copied page image processed in accordance with the security information in the image data storage 555. At this time, the image processing unit 520 stores the above copied page image as a preview image (the above copied page image is displayed when the preview of the above page of the document image is displayed). Accordingly, the image processing unit 520 stores the above copied page image in the image data storage 555 while relating it to the source page image of the document image (FIG. 6B: S119).

After the image quality degradation process is performed for the copied page image, the image processing unit 520 notifies the preview display controlling unit 510 that the image quality degradation process was applied to the copied page image. In response to this, the preview display controlling unit 510 obtains the copied page image, to which the image quality degradation process was applied, from the image data storage 555 and causes the display receiving unit 500 (touch panel 301) to display the copied page image in a security display mode (FIG. 6B: NO in S120→S121).

If the preview display controlling unit 510 judges that no security information is added to the document image, the obtained page image is stored as a preview image and a preview of the source page image is displayed (FIG. 6B: NO in S116→S124).

Figure 8B:
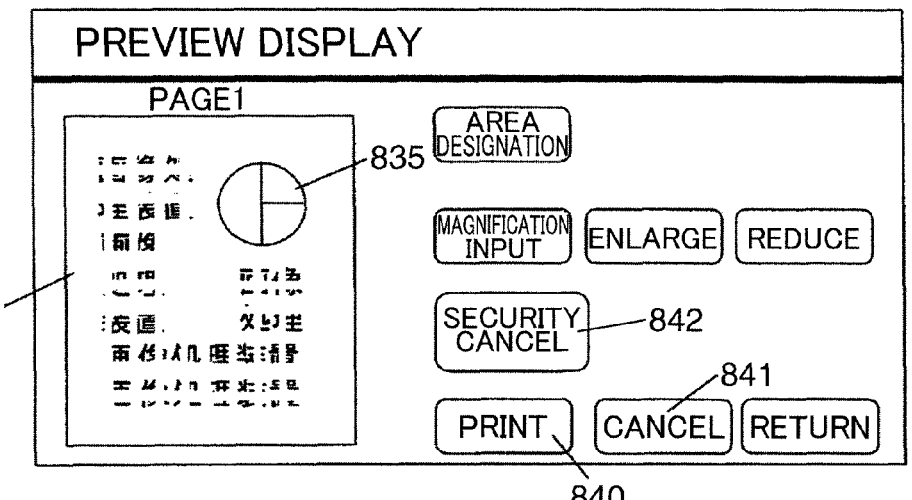
Figure 8C:
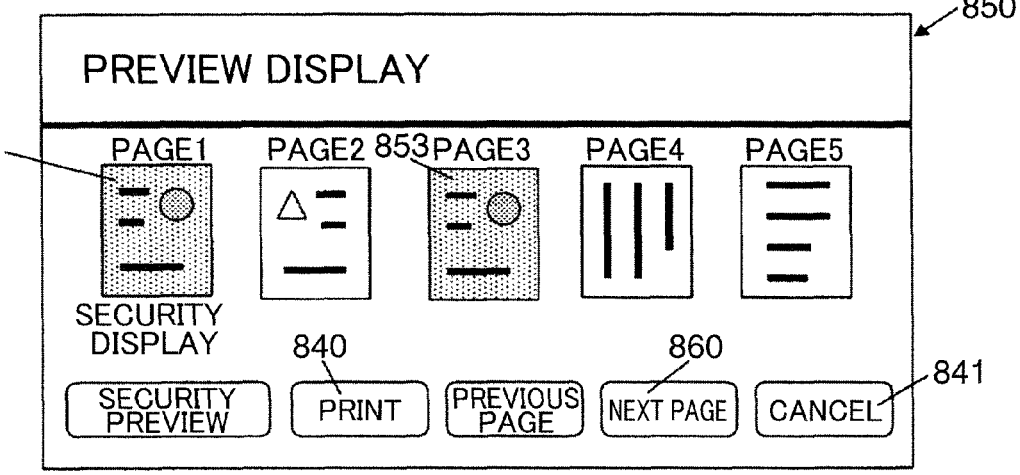

For example, the display receiving unit 500 displays a copied page image 830 having the image quality degradation process applied thereto and shown in FIG. 8B or 8C on the touch panel 301. FIG. 8B shows an example in which a preview is displayed on the touch panel 301 for each page image. In the preview image displayed here, only the character area is displayed with reduced resolution and a graphic 835 as a non-character area is displayed without the resolution being reduced. Thus, the user can judge whether or not the displayed preview image is the image selected by him or her by confirming the graphic 835 in the non-character area displayed without the resolution being reduced.

FIG. 8C shows an example in which a preview of five page images is displayed at once in the page order of the document images on the touch panel 301. Since security setting is made for the first and third pages in this embodiment, page images 851, 853 of the first and third pages are displayed with security.

If there are many pages of document images, a specified number of page images can be displayed at once on the touch panel 301. For example, the next specified number of page images can be displayed if the user presses down a "NEXT PAGE" item 860.

The preview display controlling unit 510 judges whether or not the next page image is present for the document images obtained from the image data storage 555. If the next page image is present, the page number N is incremented by 1 and this routine returns to Step S116 to repeat the above operation (FIG. 6B: YES in S120→S125).

If the display receiving unit 500 displays the previews of the above page images on the touch panel 301 as described above and the user only confirms the document images, but does not proceed to an image forming process, the user presses down a "CANCEL" item 841 shown in FIG. 8B. In response to this, the display receiving unit 500 stops the display of the page images on the touch panel 301 to end the process of the complex machine 100 (FIG. 6B: NO in S122→END). If no operation is made by the user for a specified time after the display of the above page images on the touch panel 301 even though the "CANCEL" item 841 is not pressed down, the display receiving unit 500 may also stop the display of the page images on the touch panel 301 to end the process of the complex machine 100.

On the other hand, the display receiving unit 500 displays the preview of the above page images on the touch panel 301 and the user proceeds to the image forming process as follows in the case of requesting the image forming process (FIG. 6B: YES in S122).

For example, the user presses down a "PRINT" item 840 shown in FIG. 8B. In response to this, the display receiving unit 500 receives a request of the image forming process for this document images. Then, the display receiving unit 500 instructs the function providing unit 560 to form images of the document images on the setting condition stored in the setting condition storage 550. In response to this, the function providing unit 560 obtains the above document images from the image date storage 555 and forms the images of the document images on the setting condition stored on the setting condition storage 550 (FIG. 6B: S123→END). When the function providing unit 560 obtains the document images from the image date storage 555, the source page images related to the copied page images are obtained for the copied page images displayed with security.

On the other hand, if there is an image formation request from the user although there is no request for preview display, images are formed without displaying the previews (FIG. 6B: NO in S113→S122).

(Second Embodiment)

Figure 9A:
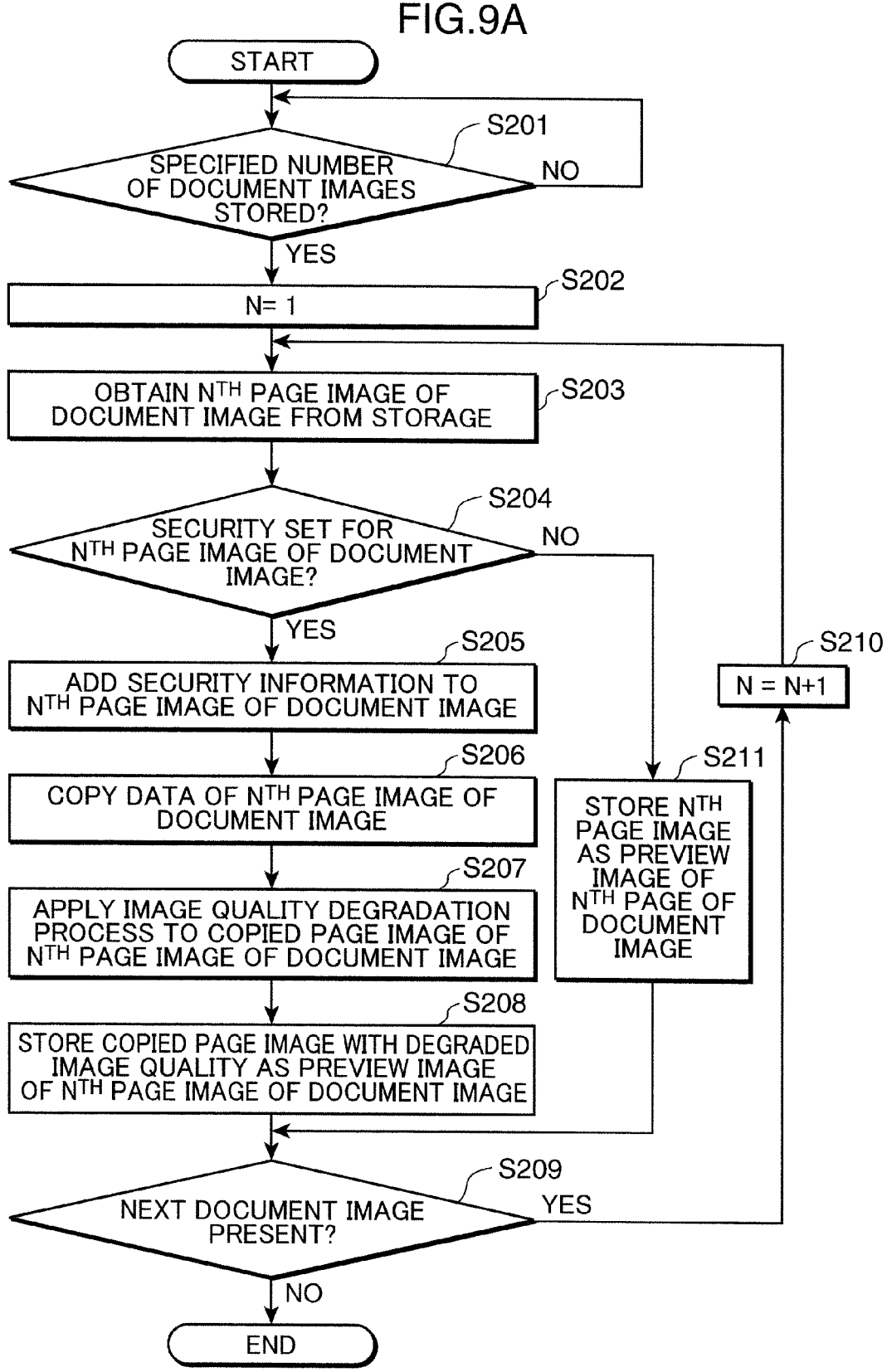
FIGS. 9A and 9B are flow charts showing a preview display process according to a second embodiment.
Figure 9B:
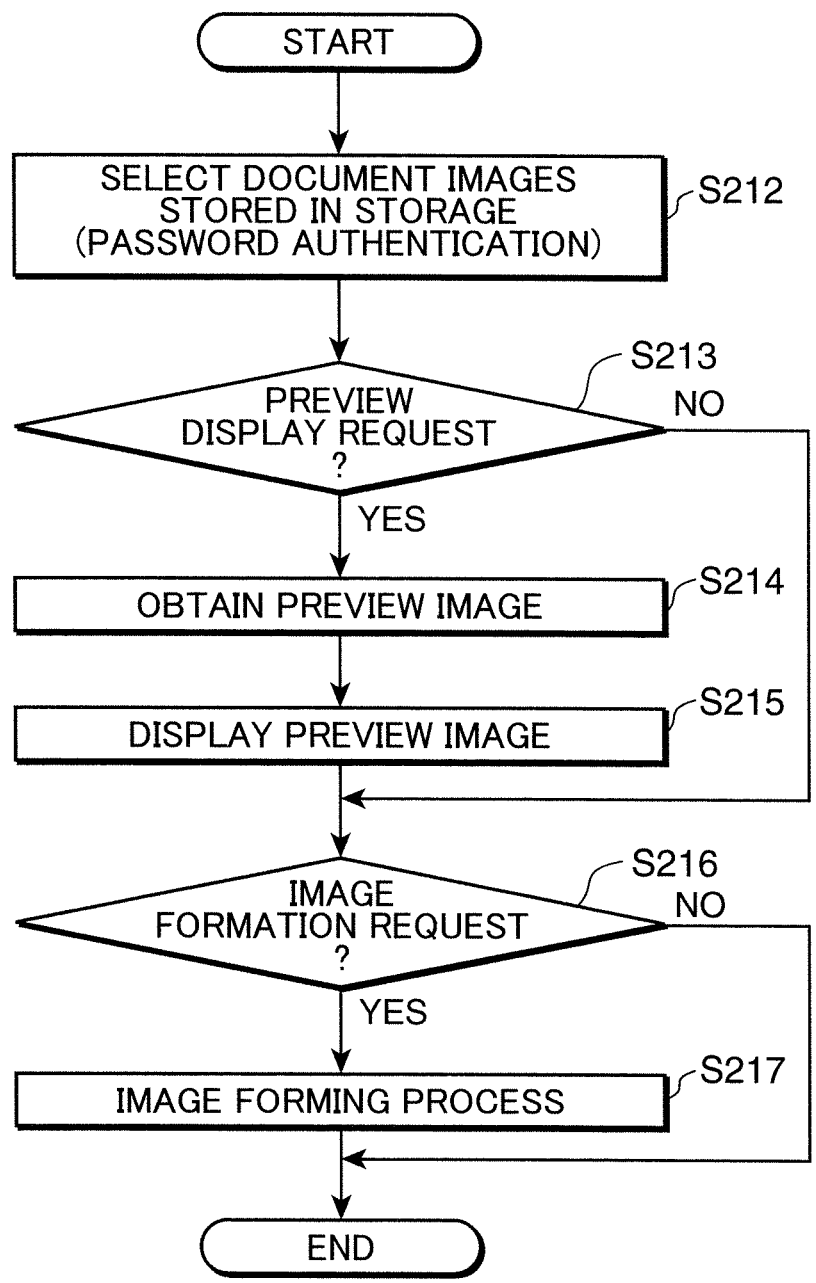
Figure 10A:
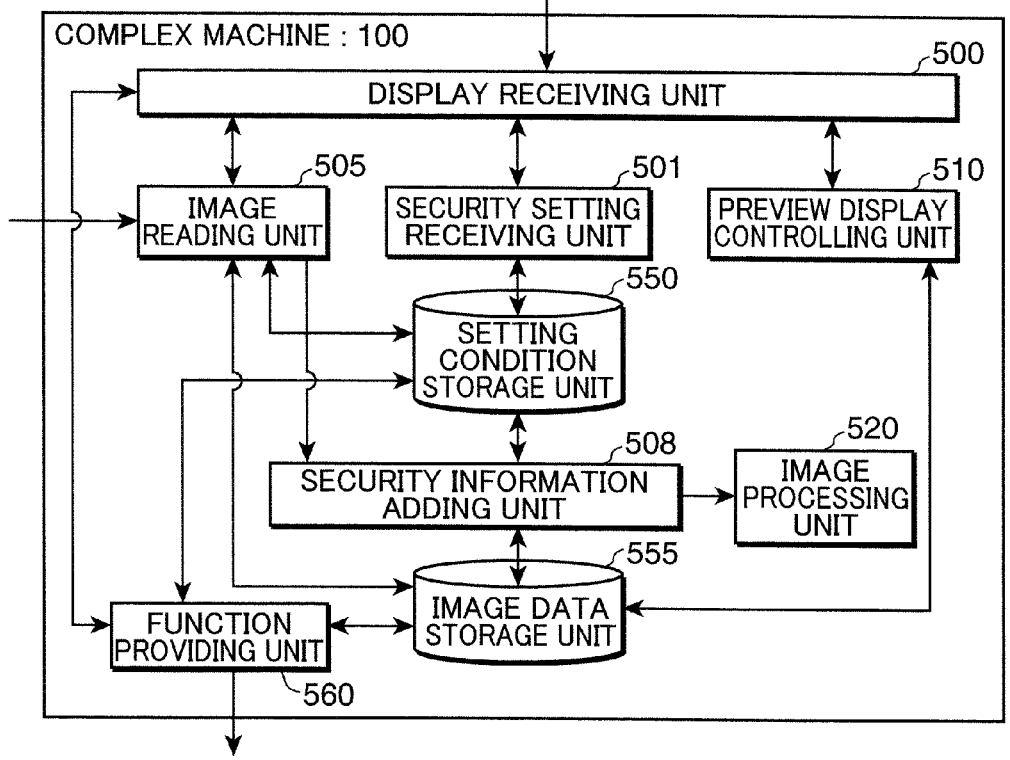
FIG. 10A is a functional block diagram of a complex machine according to the second embodiment.

In the complex machine 100 of the first embodiment, the image processing unit 520 applies the image quality degradation process when the preview display controlling unit 510 displays the previews with security on the touch panel 301 via the display receiving unit 500. On the contrary, a complex machine 100 of a second embodiment differs in that an image processing unit 520 applies an image quality degradation process when a document is read. The complex machine 100 of the second embodiment is described with reference to FIGS. 9A, 9B, and 10A. FIGS. 9A and 9B are flow charts showing a preview display process according to the second embodiment, and FIG. 10A is a functional block diagram of the complex machine 100 according to the second embodiment.

Similar to the first embodiment, when a user sets a document reading condition and a security preview setting condition and presses down a "READING START" item 780 shown in FIG. 7C, a security setting receiving unit 501 receives the document reading condition and the security preview setting condition, and stores these setting conditions in a setting condition storage 550. Further, an image reading unit 505 starts reading documents and successively stores read images (page images) in an image date storage 555.

Thereafter, the image reading unit 505 notifies a security information adding unit 508 that the read images were stored in the image date storage 555. In response to this, the security information adding unit 508 judges that security setting can be set (FIG. 9A: YES in S201).

Subsequently, the security information adding unit 508 sets a page number counter N for the document images to 1, and obtains the page images of the document images stored in the image date storage 555 (FIG. 9A: S202→S203). Then, the security information adding unit 508 judges whether or not security setting was made by the user for each of the page images of the document images stored in the image date storage 555 by referring to the security setting condition stored in the setting condition storage 550.

If the security information adding unit 508 judges that security setting was made by the user for a specific page image of the document (FIG. 9A: YES in S204), security information is added to the above page image (S205). If the security information is added to the page image, the security information adding unit 508 notifies the image processing unit 520 that the security information was added to the page image.

In response to this, the image processing unit 520 copies the data of the page image (source page images) added with the security information to obtain a copied page image (S206). Subsequently, the image processing unit 520 applies the image quality degradation process to the above copied page image (S207). This process is not described since being the same as the one in Step S118 of the first embodiment.

After applying the image quality degradation process to the copied page image, the image processing unit 520 stores the above copied page image as a preview image in the image date storage 555. The image processing unit 520 stores the above copied page image in the image date storage 555 while relating it to the source page image of the document image (S208).

On the other hand, for the page image of the document image judged to have no security setting made therefor by the user, the obtained image is stored as a preview image in the image date storage 555 (FIG. 9A: NO in S204→S211).

The security setting receiving unit 501 performs the above process for all the page images of the document images stored in the image date storage 555 (YES in S209→S210) and ends the process when the process was performed for all the page images (NO in S209→END).

Subsequently, if the user instructs the display receiving unit 500 to display previews of the document images stored in the image date storage 555, the document images stored in the image date storage 555 are selected. This process is not described since being same as the one in Step S112 of the first embodiment (FIG. 9B: S212).

Subsequently, if the user selects a specified document image from the image date storage 555 and presses down a "PREVIEW DISPLAY" item 810 (FIG. 9B: YES in S213), the preview display controlling unit 510 obtains the preview image of the selected document image from the image date storage 555 (S214). Then, the preview display controlling unit 510 causes the obtained preview image to be displayed on a touch panel 301 via the display receiving unit 500 (S215).

Out of the document images, copied page images with degraded image quality are stored as preview images in the image date storage 555 for pages wished to be displayed with security by the user and page images with no image quality degradation are stored as preview images for pages needed not to be displayed with security. Thus, when the preview display controlling unit 510 displays the above preview images, previews of images are displayed with security for the pages whose document images need to be displayed with security and previews of images are displayed without security for pages whose document images need not be displayed with security. The succeeding process is not described since being the same as in the first embodiment.

(Modification of the Above Embodiments)

(1) The source page images and the copied page images are stored in the image date storage 555 in the above first and second embodiments. In addition, the complex machine 100 may transmit source page images to an arbitrary transmission end.

For example, when the image processing unit 520 applies the image quality degradation process, the data of the source page image is copied and this copied page image is transmitted to an arbitrary destination designated by the user. Thereafter, the image processing unit 520 applies the image quality degradation process to the source page image stored in the image data storage 555.

Figure 10B:
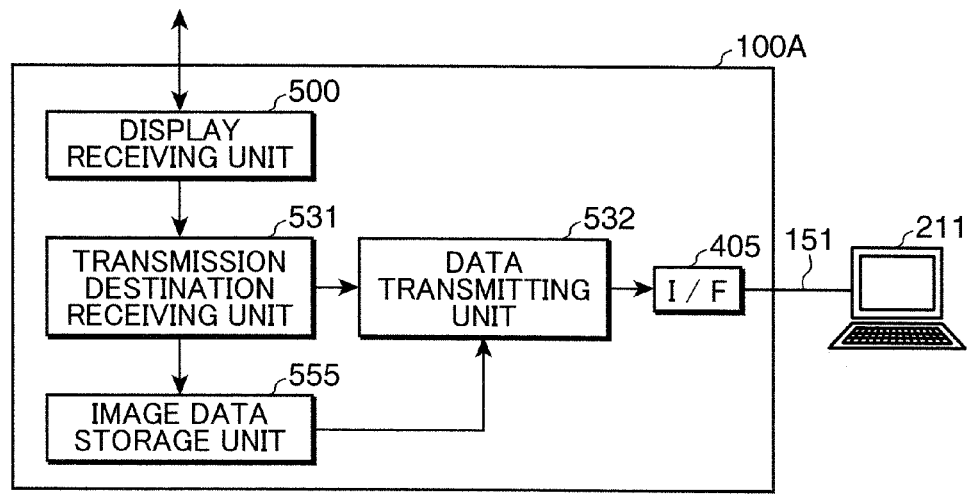
FIG. 10B is a schematic functional block diagram of a complex machine according to a modification.

In this case, as shown in FIG. 10B, it can be assumed that a complex machine 100A includes a transmission destination receiving unit 531 for receiving a transmission destination of the page image data from the user via a display receiving unit 500 before the document image is read and a data transmitting unit 532 for transmitting the data of the source page image corresponding to the copied page image to the transmission destination when a preview display controlling unit 510 displays a preview of the copied page image with security. The transmission destination is, for example, a personal computer 211, and the data transmitting unit 532 transmits the data of the source page image to the personal computer 211 via an I/F 405 and a network 151. In FIG. 10B, only blocks relating to this modification are shown and other unillustrated constructions are the same as in FIG. 5 or 10A.

It is preferable to build such a system that an instruction to form a document image can be given to the above complex machine 100A from the personal computer 211 having received the above page image. In this case, the user can give a print instruction after confirming the page image, to which no image quality degradation process is applied, on the screen of the personal computer 211.

(2) In the first and second embodiments, a document image wished to be displayed with security is selected beforehand by the user before the image reading unit 505 reads the document image. On the contrary, a page image of a document image wished to be displayed with security may be selected by the user after the image reading unit 505 reads the document image.

Figure 11A:
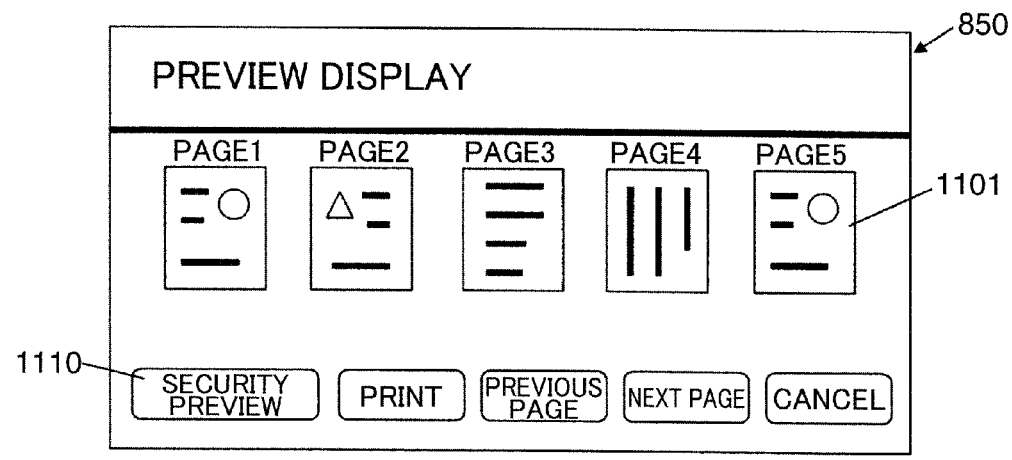
FIGS. 11A and 11B are diagrams showing other exemplary screens to be displayed on the touch panel.
Figure 11B:
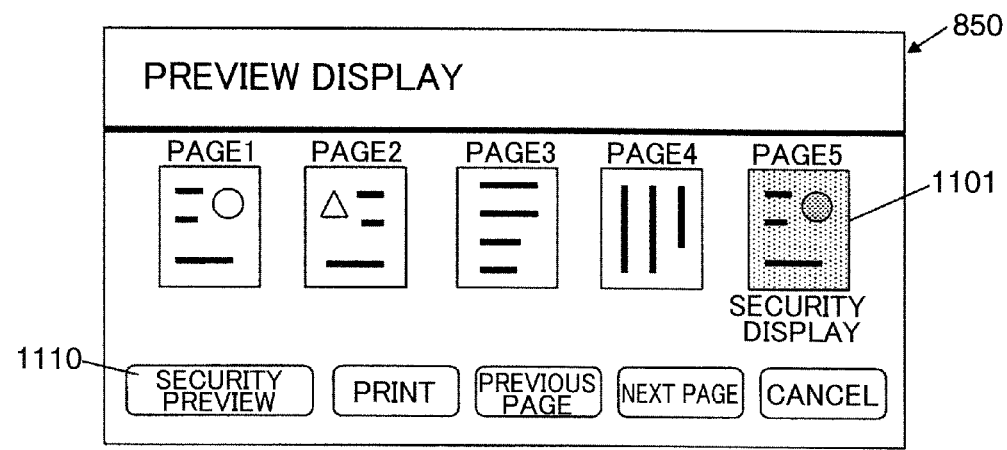

For example, the preview display controlling unit 510 causes read document images to be displayed on a display screen 850 as shown in FIG. 11A. It is assumed that the user further selected a page image (e.g. image 1101) wished to be displayed with security out of these document images and pressed down a "SECURITY PREVIEW" item 1110. The preview display controlling unit 510 receives this operation and causes the image processing unit 520 to apply the image quality degradation process to an image data corresponding to the image 1101. In this way, the selected image 1101 is displayed with security as shown in FIG. 11B. The image processing unit 520 may apply the image quality degradation process after the security information adding unit 508 adds security information to this page image.

(3) In the above first and second embodiments, the password authentication is employed upon opening the document BOX storing the document images. On the contrary, the password authentication may be performed upon printing a document image related to a copied page image displayed with security. For example, the user may be able to set a password when security preview setting is made on the security preview setting condition input screen 760 (FIG. 7C). In this case, the above password authentication is necessary upon printing the source page image related to the document image displayed with security (copied page image).

(4) In the above first and second embodiments, the quality of the character area is degraded. On the contrary, it is also possible to apply an image quality degradation process or the like to the non-character area other than the character area. For example, security display can be made without destroying the outline of the document image such as the layout thereof by displaying another image in a superimposition manner in the non-character area.

As the image quality degradation process, an image blurring process or a process for displaying a color image as a black-and-white image may be employed in addition to the method for reducing a resolution for a specified area, e.g. an area including characters. Since an image blurring method and a method for displaying a color image as a black-and-white image can be realized by known methods, they are not described. If the method for displaying a color image as a black-and-white image is employed, it is possible to make the image inconspicuous, wherefore the effects of the security display can be generated also by this method.

(5) In the above first and second embodiment, the security of the document image displayed with security may be canceled. For example, if the user pressed down a "SECURITY CANCEL" item 842 (requests a security cancellation) as shown in FIG. 8B, the preview display controlling unit 510 may receive this, stop displaying the copied page image whose quality was degraded and display the source page image related to this copied page image. It is preferable to conduct password authentication when the preview display controlling unit 510 receives a security cancellation request.

(6) In the above first and second embodiments, the image reading unit 505 (reading unit 110) displays the data of the read document image with security. Instead, an image data fed from the outside, an image data fed, for example, from the personal computer 211 via the network 151, or an image data fed to the complex machine 100 via a USB memory or the like may be displayed with security.

(7) In the above first and second embodiments, the image display device according to the present invention is applied to the image forming apparatus (complex machine 100). The image display device according to the present invention is also applicable to an electrical apparatus or a mechanical apparatus associated with various displays other than the image forming apparatus.

The above specific embodiments mainly include inventions having the following constructions.

An image display device according to one aspect of the present invention comprises a storage for storing an image; a display for displaying a preview of the image; a security setting receiving unit for receiving setting as to whether or not the preview of the image is to be displayed with security; an image processing unit for applying an image quality degradation process to the image for which the security setting receiving unit received the setting for displaying the preview of the image with security; and a preview display controlling unit for causing the image having the image quality degradation process applied by the image processing unit to be displayed at the time of the preview display of the image for which the setting for the security display was received.

With the above construction, the image processing unit displays the preview of the document image having the image quality degradation process applied thereto, whereby display can be made with security maintained. Accordingly, when the document image is confirmed on a preview screen, it is possible to prevent others from seeing the preview screen and knowing the content of the document image and to enable a user himself or herself to specify the preview-displayed document image.

In the above construction, a reading unit for reading a document image is further provided and the image is a document image read by the reading unit. According to this construction, this image display device can be applied to an image forming apparatus for forming an image of a document image.

In the above construction, the image quality degradation process by the image processing unit can be applied when the preview display controlling unit displays an image with security. Alternatively, the image quality degradation process by the image processing unit can be applied when the reading unit reads a document image.

In the above construction, it is preferable that a security information adding unit for adding security information indicating an image to be displayed with security to the image when the security setting receiving unit receives the setting for displaying the preview of the image with security is further provided; that the image processing unit applies the image quality degradation process to a specific area of the image added with the security information; and that the preview display controlling unit displays the image having the image quality degradation process applied thereto if the image is added with the security information when the preview of the image is displayed.

According to this construction, since the preview of the document image having the image quality degradation process applied to the specific area thereof can be displayed for the document image to be displayed with security, the user can more easily specify the preview-displayed document image.

In the above construction, it is preferable that the security setting receiving unit receives the setting as to whether or not the image is to be displayed with security for each page of the image; and that the security information adding unit adds the security information to a page image which is an image corresponding to the received page.

According to this construction, security display can be set page by page for a document image including a plurality of pages. Thus, a specified security display process can be performed for an image truly needing the security display.

In the above construction, the specific area to which the image processing unit applies the image quality degradation process is preferably a character area of the image. Since secret information is written in characters in many cases, information can be protected by applying the image quality degradation process to the character area.

In this case, the image quality degradation process applied to the character area by the image processing unit preferably includes at least any one of a process for changing a color image in the character area into a black-and-white image, a process for reducing the resolution of the character area to a specified resolution, and a process for blurring the character area. According to this construction, the image quality degradation process can be applied using existing image processing technologies.

In the above construction, it is preferable that the image processing unit is capable of applying a plurality of types of image quality degradation processes; and that the security setting receiving unit receives the selection of a specific image quality degradation process from a user out of the plurality of types of image quality degradation processes before the document image is read. According to this construction, the user can designate how the image is to be displayed with security.

In the above construction, it is preferable to further comprise a transmission destination receiving unit for receiving a transmission destination of the data of the document image from a user before the document image is read and a data transmitting unit for transmitting the data of the security-displayed document image to the transmission destination when the document image is displayed with security on the display. According to this construction, the user can give a print instruction after confirming a page image having no image quality degradation process applied thereto on a screen of an apparatus having received the data transmission.

An image forming apparatus according to another aspect of the present invention comprises a printing unit for forming an image on a sheet; and an image display device for displaying the image, wherein the image display device has the above construction.

According to the image display device and the image forming apparatus of the present invention described above, a document image designated by the user at the time of preview display can be displayed with security. Further, security display is made by degrading the image quality of a specific area, e.g. a character area of the document image, whereby the user can specify the security-displayed document image.

This application is based on Japanese patent application serial no. 2009-106367, filed in Japan Patent Office on Apr. 24, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image display device, comprising:
a display for displaying a preview of a document image;
a display receiving unit for displaying an input screen to input a page number of the page to become the document image out of a group of the document images that will have the preview of the document image displayed with security;
a reading unit for reading the group of the document images after the number is input on the input screen;
a security information adding unit for adding security information indicating the image document to be displayed with security to the image document of the page that has had the page number thereof input on the input screen out of the group of the document images read by the reading unit;
an image processing unit for applying an image quality degradation process to a specific area of the image document added with the security; and
a preview display controlling unit for causing the image document having the image quality degradation process to be displayed if the image document is added with the security information when the preview display of the image document is displayed
wherein the specific area to which the image processing unit applies the image quality degradation process is a character area of the document image;
wherein the image quality degradation process applied to the character area by the image processing unit includes at least any one of a process for changing a color image in the character area into a black-and-white image, a process for reducing the resolution of the character area to a specified resolution, and a process for blurring the character area.

2. An image display device according to claim 1, wherein the image quality degradation process by the image processing unit is applied when the preview display controlling unit displays a document image with security.

3. An image display device according to claim 1, wherein the image quality degradation process by the image processing unit is applied when the reading unit reads a document image.

4. An image display device according to claim 1, wherein:
- whether or not the document image is to be displayed with security is set for each page of the image on the input screen; and
- the security information adding unit adds the security information to a page image which is a document image corresponding to the set page.

5. An image display device according to claim 1, wherein
- the image processing unit is capable of applying a plurality of types of image quality degradation processes; and
- the security setting receiving unit receives the selection of a specific image quality degradation process from a user out of the plurality of types of image quality degradation processes before the document image is read.

6. An image display device according to claim 1, further comprising:
- a transmission destination receiving unit for receiving a transmission destination of the data of the document image from a user before the document image is read; and
- a data transmitting unit for transmitting the data of the security-displayed document image to the transmission destination when the document image is displayed with security on the display.

7. An image forming apparatus, comprising:
- a printing unit for forming a document image on a sheet; and
- an image display device for displaying a document image, wherein the image display device includes:
- a display for displaying a preview of the document image;
- a display receiving unit for displaying an input screen to input a page number of the page to become the document image out of a group of the document images that will have the preview of the document image displayed with security;
- a reading unit for reading the group of the document images after the number is input on the input screen;
- a security information adding unit for adding security information indicating the image document to be displayed with security to the image document of the page that has had the page number thereof input on the input screen out of the group of the document images read by the reading unit;
- an image processing unit for applying an image quality degradation process to a specific area of the image document added with the security information; and
- a preview display controlling unit for causing the image document having the image quality degradation process to be displayed if the image document is added with the security information when the preview display of the image document is displayed
- wherein the specific area to which the image processing unit applies the image quality degradation process is a character area of the document image;
- wherein the image quality degradation process applied to the character area by the image processing unit includes at least any one of a process for changing a color image in the character area into a black-and-white image, a process for reducing the resolution of the character area to a specified resolution, and a process for blurring the character area.

8. An image forming apparatus according to claim 7, wherein the image quality degradation process by the image processing unit is applied when the preview display controlling unit displays a document image with security.

9. An image forming apparatus according to claim 7, wherein the image quality degradation process by the image processing unit is applied when the reading unit reads a document image.

10. An image forming apparatus according to claim 7, wherein:
- whether or not the document image is to be displayed with security is set for each page of the document image on the input screen; and
- the security information adding unit adds the security information to a page image which is a document image corresponding to the set page.

11. An image forming apparatus according to claim 7, wherein
- the image processing unit is capable of applying a plurality of types of image quality degradation processes;
- the image display device further comprising a security setting receiving unit receives the selection of a specific image quality degradation process from a user out of the plurality of types of image quality degradation processes before the document image is read.

12. An image forming apparatus according to claim 7, further comprising:
- a transmission destination receiving unit for receiving a transmission destination of the data of the document image from a user before the document image is read; and
- a data transmitting unit for transmitting the data of the security-displayed document image to the transmission destination when the document image is displayed with security on the display.

* * * * *